Patented May 25, 1943

2,319,848

UNITED STATES PATENT OFFICE 2,319,848

PROCESS FOR PREPARING BRANCHED-CHAIN ALIPHATIC SECONDARY AMINES

Jared W. Clark, Charleston, W. Va., and Alexander L. Wilson, Pittsburgh, Pa., assignors to Carbide and Carbon Chemicals Corporation, a corporation of New York No Drawing. Original application June 30, 1937, Serial No. 151,172. Divided and this application October 11, 1939, Serial No. 298,916

4 Claims. (Cl. 260—566)

This invention relates to the preparation of intermediate compounds which greatly facilitate the production of pure secondary amines from branched-chain saturated aliphatic aldehydes. Broadly, the process comprises the reaction of a branched-chain saturated aliphatic aldehyde having at least five carbon atoms with ammonia to produce an unsaturated nitrogenous body which may then be isolated and hydrogenated to produce high yields of the corresponding secondary amine substantially without contamination by primary or tertiary amines. The aliphatic branched-chain aldehydes to which this invention is especially applicable are those in which the side chain is adjacent to the carbonyl group, or in the alpha position.

Amines are ordinarily prepared by the reaction of a monohalogenated hydrocarbon with ammonia, or by simultaneous reaction of a carbonyl compound with ammonia and hydrogen. With either of these methods, mixtures containing the primary, secondary and tertiary amines are almost invariably obtained. It is sometimes possible to control the conditions of reaction so that unusual series of high-boiling unsaturated imines from which, by hydrogenation, the secondary amines are obtained in high yield and pure form. The present invention resides in the process of preparing this class of unsaturated imines which makes possible the production of the pure secondary amines.

The formation of the secondary amines thus may be considered as a two-step reaction of which this invention provides the first step. In the first step, the alpha branched-chain aldehyde is reacted with ammonia to produce the new unsaturated imine which is purified of unreacted materials. The second step consists in hydrogenating the isolated unsaturated imine to form the secondary amine in pure form. The following equation, showing the reaction of 2-ethyl-hexaldehyde with ammonia, will serve as an illustration of the reaction, which appears to be characteristic of all alpha branched-chain aldehydes having at least five or more carbon atoms, with ammonia to form the new class of unsaturated imines. The first step of the reaction probably takes place as follows:

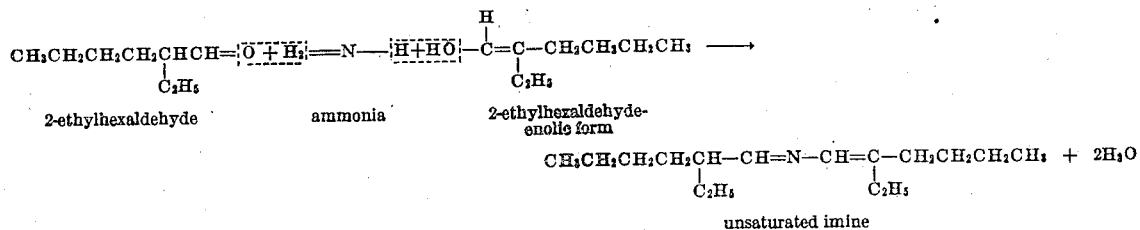

the product is substantially the primary amine but it is impossible to produce the secondary amine substantially free from contamination by the primary and tertiary amines. Such mixtures are often very difficult to separate because of such obstacles as proximity of boiling points, and the like.

By using the process of this invention as a first step, secondary amines of high purity may be prepared quickly, efficiently and in excellent yields, and substantially free from primary and tertiary amines, so that subsequent purification is not necessary. Amines such as these have a wide variety of uses, and particularly they may be employed in the preparation of improved wetting agents, and as intermediates in the synthesis of various products; and they are valuable as corrosion inhibitors for hydrocarbon oils.

In utilizing the process of this invention to prepare secondary amines, there is first obtained an The intermediate unsaturated imine formed by this reaction may be designated as 2-ethylhexaldimino-2-ethylhexene-1.

The class of unsaturated imines of which the above compound is typical is not to be confused with the type of imines known as Schiff's bases, although they may have the same empirical formula. Structurally, the difference between the new imines and Schiff's bases lies in the position of the double bond between the carbon atoms. The amines of the present invention cannot be made by the reaction of an aldehyde and a primary amine, nor can Schiff's bases be made by the reaction of an aldehyde with ammonia. In an unsaturated Schiff's base prepared by the reaction of a primary amine with an unsaturated aldehyde, the carbon-to-carbon double bond is in the same group or radical with which the nitrogen is connected by a double bond, whereas in the unsaturated imines disclosed herein the carbonto-carbon double bond connects the same carbon atom as is connected by a single bond to the nitrogen. In other words, the nitrogen is connected to two unsaturated carbon atoms. Further evidence that these unsaturated imines are distinct from Schiff's bases lies in the fact that they may be hydrolyzed to one molecule of ammonia and two molecules of aldehyde, whereas Schiff's bases always yield one molecule of amine and one molecule of aldehyde upon hydrolysis. In addition, these new unsaturated imines are not basic but are neutral. This difference is believed due to the "key" position of the carbon-to-carbon double bond in the newly described imines, because of which they may undergo a tautomeric change in chemical reactions. Therefore the position of this double bond in the new imines is not analogous to any other position in the molecule where a double bond could exist. These new unsaturated imines are characterized by the group

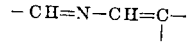

and the preferred ones for use in the present invention may be designated by the formula

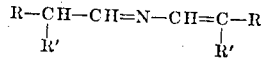

wherein R is an alkyl group having more than one carbon atom, and R' is an alkyl group preferably having from one to four carbon atoms.

The second step comprises the hydrogenation of the above unsaturated imine, and takes place according to the following typical equation:

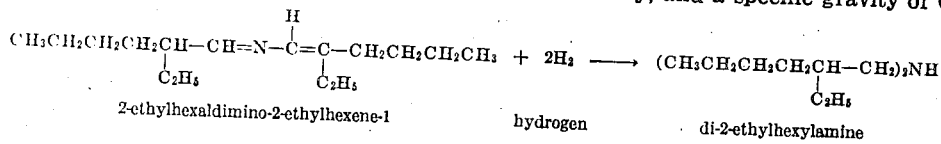

2-ethylhexaldimino-2-ethylhexene-1     hydrogen     di-2-ethylhexylamine

It has been found in hydrogenating, for example, with a "Raney" nickel catalyst, that it is possible to saturate about 80% of the ammonia-aldehyde reaction product by passing a stream of hydrogen through the reactants at atmospheric pressure. A nearly complete saturation of the intermediate unsaturated body, however, may be accomplished by hydrogenating under pressures above atmospheric. This may suitably be carried out by the use of a steel bomb, or by any similar high pressure device, which is preferably equipped with a heating coil, temperature indicator, and pressure gauge. The contents of the bomb are well mixed by means of an agitator, and hydrogen is passed into the bomb until the desired pressure is reached. As the hydrogen is consumed in the reaction, the pressure drops and more hydrogen is added until completion of the hydrogenation reaction is indicated by the absence of further decrease in pressure.

The following examples serve to illustrate the invention:

Example 1

An excess of anhydrous ammonia was diffused through 775 parts by weight of 2-ethylhexaldehyde in a suitalbe container until the liquid aldehyde was completely saturated, the whole being maintained at a temperature from about 24° to about 26° C. This mixture, at the temperature indicated, was allowed to react for 20 hours, after which time the water separated as an insoluble layer and was decanted. The unsaturated imine thus produced was distilled under reduced pressure to remove any excess unreacted aldehyde. Six hundred and six parts by weight of the unsaturated imine were obtained, corresponding to about 83% of the theoretical yield. The unsaturated imine recovered, which may be designated by the formula

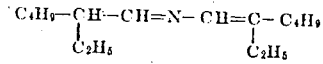

was a colorless oily liquid, insoluble in water and soluble in most organic solvents. It had a boiling point of about 133° to 135° C. at an absolute pressure of 8 mm. of mercury, and a specific gravity of 0.823 at 20°/20° C.

Three hundred and twenty-three parts by weight of the unsaturated imine were then subjected to hydrogenation in an electrically heated, high pressure bomb, at a gauge pressure from about 450 to 1100 pounds per square inch. A reaction temperature of about 125° C. was maintained for 4 hours in the presence of 20 parts by weight of a "Raney" nickel catalyst (wet with methanol) such, for example, as is shown in Patent 1,628,190 to Murray Raney. After filtration to remove the catalyst, the hydrogenated product was a colorless liquid, which, on analysis, was determined to be practically pure di-2-ethylhexylamine. It was found that 310 parts by weight of the amine were obtained, corresponding to 94% of the theoretical yield. This compound was a colorless oily liquid with a boiling point of 123° C. at an absolute pressure of 5 mm. of mercury, and a specific gravity of 0.805 at 20°/20° C.

Example 2

An excess of anhydrous ammonia was diffused through 609 parts by weight of 2-methylbutyraldehyde until the liquid aldehyde was completely saturated, the whole being maintained at a temperature from about 20° to about 25° C. The mixture at the temperature indicated was allowed to react for 7 hours, after which time the water which separated as an insoluble layer was decanted. Four hundred and thirteen parts by weight of the unsaturated imine were formed, corresponding to 76.2% of the theoretical yield. The unsaturated imine thus produced was then distilled under reduced pressure to remove any unreacted aldehyde. The recovered imine, which may be designated by the formula

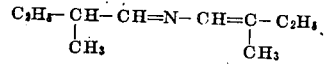

had solubility characteristics similar to the unsaturated imine described in Example 1, being insoluble in water and soluble in most organic solvents. The boiling point of this imine was found to be 65° C. at an absolute pressure of 8 mm. of mercury, and it had a specific gravity of 0.809 at 20°/20° C.

Three hundred and sixty-seven parts by weight of the imine in the presence of 8.5 parts by weight of nickel catalyst were then hydrogenated in a manner similar to that set forth in Example 1, using in this case a temperature from about 100° to about 128° C. for 4.5 hours, and a pressure of from about 250 to 1050 pounds per square inch. Three hundred and eleven parts by weight of di-2-methylbutylamine were obtained, showing a yield of 83% for the process. This secondary amine exhibited the same general characteristics as the one described in Example 1, in that it was insoluble in water and soluble in most organic solvents. The boiling point of the di-2-methylbutylamine formed in this example was found to be 60° C. at an absolute pressure of 8 mm. of mercury, and it had a specific gravity of 0.776 at 20°/20° C.

*Example 3*

As in the previous examples, an excess of anhydrous ammonia was dispersed through 628 parts by weight of 2-methyl-pentaldehyde at a temperature from about 15° to about 25° C., and for a period of 7.5 hours. Four hundred and thirty-four parts by weight of the imine were obtained, corresponding to a yield of 76.8%. This unsaturated imine, like the previous ones prepared, was insoluble in water and soluble in most organic solvents. It may be designated by the formula

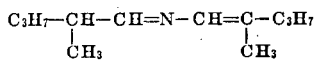

Its boiling point was found to be 89° C. at an absolute pressure of 8.5 mm. of mercury.

The imine, in an amount of 377 parts by weight, was subjected to hydrogenation for 7 hours at a temperature from about 100° to about 140° C., and at a pressure from about 200 to about 1100 pounds per square inch. Eight and one-half parts by weight of nickel catalyst were used. Three hundred and thirty-four parts by weight of di-2-methylpentylamine were obtained, indicating a yield of 87.6% for the process. The general characteristics of this secondary amine were similar to those of the amines heretofore described, and its specific gravity was found to be 0.784 at 20°/20° C., and its boiling point was 91.5° C. at an absolute pressure of 8.5 mm. of mercury.

*Example 4*

By a procedure substantially the same as in the above examples, 785 parts by weight of 2-ethylbutyraldehyde were reacted with an excess of anhydrous ammonia, the whole being maintained at a temperature from about 15° to about 25° C. for 21 hours. When the reaction was complete, 2-ethylbutyraldehyde in an amount of 83 parts by weight was recovered unchanged, while 509 parts by weight of the unsaturated imine were obtained, indicating a yield of 71.6% and with an overall efficiency of 89.5% for the ammoniation process. This unsaturated imine, as in the previous cases, was a water-white liquid, insoluble in water and soluble in most organic solvents, such as gasoline and paraffin oils. It may be designated by the formula

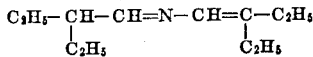

It had a specific gravity of 0.814 at 20°/20° C., and a boiling point of 76.0° C. at an absolute pressure of 3 mm. of mercury.

The unsaturated imine in an amount of 460 parts by weight was subjected to hydrogenation in the presence of 10 parts by weight of a "Raney" nickel catalyst, under conditions similar to those described in Example 1. The reaction temperature was maintained at from about 106° to about 135° C. for 3 hours. Four hundred and thirty-one parts by weight of di-2-ethylbutylamine were recovered, showing a yield of 91.5% and an efficiency of 93%. The secondary amine formed in this case was likewise a water-white liquid, having the general characteristics of the amines of this invention. It had a specific gravity of 0.796 at 20°/20° C., and a boiling point of 80.0° C. at an absolute pressure of 8 mm. of mercury.

The process may be varied considerably in operation by the use of other catalysts. For example, the catalyst may be other forms of nickel, as well as vanadium or platinum, which perform a function similar to the nickel catalyst employed in the above examples. The temperatures employed in the reactions to produce the unsaturated imine and the secondary amine may be varied considerably. Temperatures covering a wide range might be used, depending largely upon the pressure and the type of catalyst employed. It has been found that higher pressures aid in effecting more complete saturation of the intermediate imino substances, and thus eliminating the rather difficult separation of the saturated and unsaturated products. In general, with a nickel catalyst, pressures from about atmospheric or above are preferable. It should also be emphasized that in place of anhydrous ammonia, aqueous ammonia in varying concentration may suitably be employed. In some cases, more uniform reactions have been obtained, using aqueous ammonia, and this fact was particularly noted in the preparation of di-2-ethylbutylamine.

The foregoing description is given by way of illustration and many modifications of the process may be made within the scope of the invention as defined by the appended claims.

This application is a division of our copending application Serial No. 151,172 filed June 30, 1937.

We claim:

1. A process for preparing unsaturated acyclic imines having the characteristic group

which comprises mixing ammonia with an alpha branched-chain saturated aliphatic aldehyde having at least 5 carbon atoms, causing the aldehyde to react with the ammonia with the production of two mols of water per mol of ammonia reacted by maintaining the reaction mixture in the liquid state under non-hydrogenating conditions for a period of several hours, and separating an unsaturated acyclic imine from the reaction mixture.

2. Process for preparing an unsaturated imine having the formula:

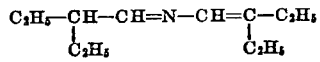

which comprises mixing ammonia with 2-ethylbutyraldehyde, causing the aldehyde to react with the ammonia with the production of two mols of water per mol of ammonia reacted by maintaining the reaction mixture in the liquid state under non-hydrogenating conditions for a period of several hours, and separating said unsaturated imine from the reaction mixture.

3. Process for preparing an unsaturated imine having the formula:

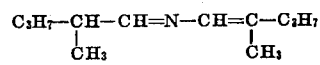

which comprises mixing ammonia with 2-methylpentaldehyde, causing the aldehyde to react with the ammonia with the production of two mols of water per mol of ammonia reacted by maintaining the reaction mixture in the liquid state under non-hydrogenating conditions for a period of several hours, and separating said unsaturated imine from the reaction mixture.

4. Process for preparing an unsaturated imine having the formula:

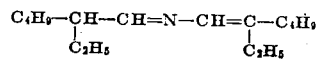

which comprises mixing ammonia with 2-ethylhexaldehyde, causing the aldehyde to react with the ammonia with the production of two mols of water per mol of ammonia reacted by maintaining the reaction mixture in the liquid state under non-hydrogenating conditions for a period of several hours, and separating said unsaturated imine from the reaction mixture.

JARED W. CLARK.
ALEXANDER L. WILSON.